Patented Oct. 16, 1951

2,571,221

UNITED STATES PATENT OFFICE 2,571,221

METHOD OF EXTRACTING ORGANIC ACIDS AND THEIR SALTS FROM CORK AND PRODUCTS RESULTING FROM THIS EXTRACTION

Georges Dupont, Paris, and André Guillemonat, Alger, France, assignors to Centre National de la Recherche Scientifique, Paris, Seine, France, a society of the Republic of France No Drawing. Application July 19, 1947, Serial No. 762,202. In France May 27, 1941

Section 1, Public Law 690, August 8, 1946
Patent expires May 27, 1961

10 Claims. (Cl. 260—418)

It is known that cork contains esters of complex organic acids, but up to now these bodies have not been seriously studied or extracted.

The present invention is concerned with methods for extracting various components from cork, in particular organic acids, and with the products thus obtained.

According to a feature of our invention, these esters are first subjected to saponification. This saponification may be carried out either by means of acidulated water under pressure, or, preferably, by means of strong alkalis such as soda or potash. In this case, saponification is very quickly performed and can be obtained at 100° C. without using any autoclave, and even in the cold state, the reaction requiring, in the latter case, some days to be complete.

The product of this saponification can be utilized as such for various uses based upon its detersive properties or we may use an aqueous solution obtained therefrom by compression or levigation.

But we may also extract from the products of saponification by means of strong alkalis the acids that have combined with the alkalis. These acids are then obtained by addition of the proper amount of a strong acid, such as sulfuric acid, capable of neutralizing exactly the amount of alkali that has been used.

By filtration, centrifugation, compression, etc., the portion of fatty acids insoluble in water is then separated from most of the acid solution that accompanies it. The product may then be dried to facilitate subsequent treatment.

According to another feature of our invention, the raw product thus acidified may be subjected to the action of a hydraulic press. If this operation is carried out in the hot state (about 100° C.), a portion of the desired acid products is driven out, in the liquid state, with water and can be directly collected.

The solid product obtained, as above set forth, from the aqueous solution, eventually after compression, is subsequently subjected to extraction by one or several suitable solvents.

Experience has taught that all solvents do not exert the same action. Some (ethyl acetate, acetic acid, methyl alcohol, acetone, etc.) form a first group characterized in that they dissolve the whole of the organic acids and may permit of extracting them from the insoluble products that accompany them, such as cellulose and lignin but the product that is obtained is then strongly colored by various components. It should be noted that among these solvents, ethyl acetate is insoluble in water and can practically be utilized for extraction only after suitable drying of the mass to be treated. Furthermore, it hydrolyses partly, during the operation, into acetic acid and alcohol. Acetic acid has the disadvantage of attacking the apparatus and being difficult to separate from water. On the contrary, methyl alcohol and acetone have the advantage of requiring no preliminary drying of the mass and of separating easily from water by mere distillation.

In this case one can treat, in a continuous extractor, products that still contain a relatively high proportion of moisture; the solvent, when passing through the mass, first carries along water with itself and, only after this, dissolves the organic acids. Water and the organic products finally collect in the distillation retort, whereas the volatile solvent returns to the cycle of operation.

It is therefore possible, with such solvents, directly to treat a mass containing still high proportions of water (averaging 50 per cent) such as may be obtained by mere centrifugation without passage through the press. On the other hand, it has been found that mixtures of methyl alcohol and acetone (either synthetic mixtures or raw methanol supplied by distillation of wood) behave in a particularly favorable manner and are preferable to pure methyl alcohol. The yield of the extraction operation is from 48 to 50 grams of acids for 100 grams of initial cork.

Other solvents, such as carbon tetrachloride and trichlorethylene which constitute a second group, dissolve only about one half of the acid components, but the products thus extracted are but slightly colored.

The actions of these two groups of solvents can be combined with a view to obtaining two types of acid components giving the first one a clear product, the second a dark colored product. Different uses may be considered for these products, the properties of which are not identical.

Extraction and separation may be effected through one of the two following methods:

1. The matter to be treated may be extracted successively first by means of a solvent of the second group which will supply the clear component, then by means of a solvent of the first group which will supply the colored component.

2. The whole of the solid components may be extracted in a single operation by means of a solvent of the first group, such as ethyl acetate, or, better, methyl alcohol or methylene, then the solvent is distilled off and the produce thus obtained is treated by a solvent of the second group, such as trichlorethylene or carbon tetrachloride, which will dissolve only the clear product and will restore it by decantation and distillation.

The complex chemical products which are designated under the names of clear component and dark component have characteristics approximating the following ones, but relatively variable according to the nature of the cork and the treatment applied.

Clear component

Color, appearance, hardness analogous to those of wax. Melting point near 70° C. Acidity index from 224 to 254 (it is reminded that the acidity index is the number of grams of potash fixed by one kilogram of the product).

This component gives, with soda, brown soaps which are good detergents but get rather strongly colored by contact with air; this defect may be attenuated in various ways in particular by addition of sodium sulfite. This clear component combines with alcohols to give esters of consistencies which may vary from that of castor oil to that of butter or tallow.

It may, on the other hand, be easily sulfonated, giving a product soluble in water, or better in an alkaline solution.

Dark component

Substance of red brown color, of resinous appearance, melting between 50° C. and 70° C. Acidity index from 254 to 311.

It undergoes in the hot state a polymerization which yields a voluminous plastic mass. This product seems capable of being used instead of dark colophonies for various uses. It may advantageously be used in particular for agglomeration of foundry sand. Like the clear component, it yields esters having lubricating properties, soaps and sulfonated derivatives.

The products thus obtained have many utilizations. It has been found that either the clear acids or the mixture such as it occurs, can be substituted for wax in various uses (encaustic, boot polish . . . ). The dark acids may be substituted for colophony for many uses; they permit of obtaining excellent agglutinants for the manufacture of foundry cores or of various agglomerates.

The alkaline salts of the clear or dark acids or of their sulfonated derivatives gave interesting results as wetting products and anti-lather products.

Finally, ethyl or other ethers of the acids, whether in the case of raw acids or in that of acids separated by means of solvents, supply, either in the raw state or after purification, synthetic fats which have an interesting lubricating power.

Preparation of the ethyl ether, for instance, may easily be performed as follows: a solution of 1 kg. of acid (either raw or obtained by extraction) in 1.5 litres of alcohol containing 20 cubic centimeters of 66 Bé. sulfuric acid is heated to boiling, for four hours. This sulfuric acid is then neutralized by the calculated amount of soda or sodium carbonate. After filtering to eliminate the sodium sulfate that is formed, the alcohol is distilled.

The raw ether thus prepared may be, if so desired, purified by means of various solvents such as essence of turpentine or cyclohexane which leave an insoluble black residue; this purification may be perfected by washing said solution with a diluted alkaline solution. By distillation of the solvent, one obtains a fat of clear or even white color, rather similar to tallow. The melting point is somewhat variable with the nature of the cork and the conditions of treatment; the yield in purified product is close to 60% with reference to the acids, therefore to 28% with respect to the cork.

We will now give some examples of application of the method according to our invention and indicate the results that have been obtained through this method.

We treated sometimes burnt cork from the manufacture of agglomerates, sometimes fresh cork. The results were very similar.

*Example 1.*—Powdered cork is treated in an autoclave by a 4 per cent solution of sulfuric acid for three hours under pressure of 8 kg. per sq. cm. Removal of excess of moisture, and extraction of the product by ethyl acetate gave 30.8 per cent of a raw acid of dark color.

*Example 2.*—500 g. of powdered (torrefied) cork were treated with 37 g. of soda dissolved in 4.5 litres of water in an autoclave, under a pressure of 3–4 kgs. maintained for a quarter of an hour. After solidification and filtration, the solid part was subjected to the following extractions:

|  | Per cent extracted from initial cork |
|---|---|
| (a) Extraction by compression at 100° | 15.0 |
| (b) Extraction by ethyl acetate | 31.0 |
|  | 46.0 |

The insoluble residue corresponded approximately to 27% of the initial weight. The two extracts were then mixed. Carbon tetrachloride permits of extracting from this mixture 47.2 per cent of a light brown product; trichlorethylene extracts 57.2 per cent of the whole but the product is darker.

*Example 3.*—1248 g. of fresh cork in shavings were treated with 400 g. of soda dissolved in 15 litres of water. The treatment was conducted under atmospheric pressure. Heating was stopped when the titer of the liquor stood constant (which required 3 hours).

After disengagement of the acids by sulfuric acid, filtration and compression, the solid mass was subjected to successive extraction with trichlorethylene and ethyl acetate:

|  | Per cent of the weight of cork |
|---|---|
| Extraction with trichlorethylene (light brown extract) | 24.6 |
| Extraction with ethyl acetate (black extract) | 21.3 |
| Total | 45.9 |

*Example 4.*—1326 g. of fresh cork, roughly crushed, were treated with 1160 g. of 36° Bé. soda lye, diluted in 12 litres of water at 100° C. for four hours. The consumption of soda was 21% of the initial weight of cork. The product was acidified with the calculated amount of a solution of hydrochloric acid, separated from the saline solution by filtration and passage through a press, and subjected to extraction by ethyl acetate.

The latter, after evaporation, supplied 604 g. (that is to say 45.5%) of total extract which, treated in the hot state with 3 liters of trichlorethylene, finally yielded 29.5% of clear product solution in this solvent and a residue of 16% of dark product.

The aqueous extract obtained on the other hand contains organic products that are soluble in water (polyacids, glycerin, etc.) in the proportion of 18 per cent of the weight of cork. These products may be utilized. The result of this latter operation may, finally, be summed up as follows (stated in per cent of the initial weight of cork):

| | Per cent |
|---|---|
| Clear extract | 29.5 |
| Dark extract | 16.0 |
| Acid portion soluble in water | 18.0 |
| Residue (cellulose, lignin, etc.) | 27.0 |
| Moisture | 3.0 |
| Losses and not measured | 6.5 |

*Example 5.*—200 g. of powdered cork are mixed with a solution of 70 g. of soda in the flake state in two liters of water. The mixture is left at ordinary temperature. After three days, the titer is free soda no longer varies (consumption 18% of the weight of cork). The whole of the product is treated with the amount of sulfuric acid corresponding to the amount of soda and the disengaged acids are extracted as in Example 4. We obtain:

| | Per cent |
|---|---|
| Clear component | 25.1 |
| Dark component | 16.5 |

The yield in acid is therefore, in this case, slightly lower than is the preceding one but the clear product that is obtained is much less colored, which is a substantial advantage for various uses.

*Example 6.*—Crushed cork is saponified at 100° C., as in Example 4, for two hours, by 22% of soda dissolved in the proper amount of water. After addition of the corresponding amount of diluted sulfuric acid into the still hot mass, we centrifugate the product and wash it on the centrifugating machine. We then proceed to direct extraction in a conventional extractor by means of methylene (or of a mixture of methyl alcohol and acetone). We subsequently recuperate the solvent by distillation and the raw mass of acids is easily separated from the water left therewith in the retort. The yield in raw acid is 48% of the weight of cork treated. A treatment by chlorine containing solvents, as in Example 4, will permit of separating the clear and dark components.

According to still another feature of our invention, the yield in acids can be considerably improved when the initial cork is, prior to soda saponification, treated in boiling water.

Here are some results:

A raw female cork from "Pyrénées Orientales" yielded, through the above treatment 33 per cent of fatty acids. Treated after preliminary boiling (for one hour and a half at 100° C.), it gave 47% of fatty acids.

A male cork of the same origin gave by the usual treatment 50 per cent of fatty acids; after boiling it gave 57%.

This boiling operation may be carried out separately. In this case, the solution that is obtained, which contains from 3 to 4 per cent of soluble products with respect to the initial cork, may be separated from the cork, to be eventually utilized in various ways (tanning extract for instance, etc.). Or alternately and in a more simple manner, this boiling operation may be performed in the very vessel where saponification is to take place, the soda solution being then added in sufficient amount at the end of the boiling operation and the boiling of the whole pursued during the correct period.

Concerning now the preparation and purification of the esters of cork acids, substantial improvements have been obtained according to our invention as follows:

For preparing the ethyl esters of cork acids we may operate either with the clear portion, or with the dark portion, or again with the raw mixture.

100 g. of acids are heated for three or four hours with 150 cubic centimeters of alcohol and about 2 cubic centimeters of 66 Bé. sulfuric acid or another strong mineral acid.

After this time we add the calculated amount of sodium carbonate to neutralize the acid and the alcohol in excess is distilled off.

The product that is obtained is a slightly siccative black grease.

Instead of ethyl alcohol, we may utilize any other alcohol and in particular methyl alcohol, glycol, glycerine and triethanolamine.

From these products, we may extract colorless or very little colored greases or oils, through methods such as the following ones:

1. *Purification by selective dissolution.*—We may utilize for this purpose various selective solvents among which cyclohexanes and essence of turpentine are particularly to be mentioned.

100 g. of esters are stirred in 500 cubic centimeters of cyclohexane in the hot state. The whole is allowed to cool down. The liquid layer is decanted and the solvent is distilled off.

Yield for 100 g. of acid:

*a.* From ethyl esters made with the whole of the acids: 60 g.

*b.* From ethyl esters formed with clear acid: 80 g.

The grease that is obtained is light brown, and is not siccative.

2. *Intensive purification.*—Purification of the ester can be improved by stirring a solution thereof with a very dilute alkaline liquor.

We dissolve for instance the product in sulfuric ether (1500 cubic centimeters for 100 g. of esters), and we filter to separate the insoluble portions.

The ether solution is stirred with 1,000 cubic centimeters of a 2 per cent soda solution. It is centrifugated. The ether solution is finally discolored by means of activated carbon.

After filtration the ether is distilled off.

The grease obtained, in the case of ethyl ether, has the color and consistency of butter.

Yield for 100 g. of acid:

(*a*) From ethyl esters made with the whole of the acids: 60 g.

(*b*) From ethyl esters made with the clear acids: 80 g.

The above indicated purification methods are given by way of example. The results may remain the same by operating in analogous conditions. For instance sulfuric ether may, in the above described operations, be replaced by another ether-oxide. On the other hand, we may make use of a mixture of benzene and ether in equal proportions. However, it was found that in this case, decantation was not so good and the final product was not so clear.

Finally, it is pointed out that the acids obtained from cork have alcohol functions in their molecules; these functions will remain free in the esters manufactured as above indicated. It is possible to esterify these alcohol functions through various acids such as acetic, maleic, phthalic acids, according to any conventional method, for instance by heating with the corresponding anhydride at 120-140 C.

The products thus obtained have a melting point lower than those of the esters. They are sometimes liquid and may have advantages for some uses, either as lubricants or as plastifiers, or as wetting products.

What we claim is:

1. The method which comprises saponifying a mass of cork by means of caustic soda in solution in water, adding to the products of this saponification an amount of a mineral acid corresponding to the amount of soda used for said saponification, separating the insoluble products of this acid treatment from the acid solution, subjecting the whole of these insoluble products to extraction by at least one solvent of the group consisting of ethyl acetate, acetic acid, methyl alcohol and acetone, distilling off this solvent and subjecting the product thus obtained to extraction with trichlorethylene to obtain a maximum recovery of fatty acids.

2. The method which comprises saponifying a mass of cork by means of a dilute caustic soda solution in water, adding to the products of this saponification an amount of sulfuric acid corresponding to the amount of soda used for said saponification, separating the insoluble fatty acid products of this acid treatment from the acid solution, subjecting the whole of these insoluble products to extraction by methyl alcohol, distilling off this alcohol and subjecting the product thus obtained to extraction with trichlorethylene to recover higher fatty acids.

3. The method according to claim 1 which further includes the step of boiling the mass of cork to be treated, prior to saponification thereof, in water at 100° C. for at least one hour and a half.

4. The method which comprises saponifying a mass of cork by means of caustic soda in solution in water, adding to the products of this saponification an amount of a mineral acid corresponding to the amount of soda used for said saponification, separating the insoluble fatty acid products of this acid treatment from the acid solution and subjecting the whole of the acids present in these insoluble products to extraction by at least one solvent of the fatty acids.

5. The method which comprises saponifying a mass of cork by means of caustic soda in solution in water, adding to the products of this saponification an amount of a mineral acid corresponding to the amount of soda used for said saponification, separating the insoluble fatty acid products of this acid treatment from the acid solution, subjecting the whole of these insoluble products to extraction by at least one solvent of the group consisting of ethyl acetate, acetic acid, methyl alcohol and acetone, distilling off this solvent and subjecting the product thus obtained to extraction by at least one solvent of the fatty acids.

6. The method which comprises saponifying a mass of cork by means of a dilute caustic soda solution in water, adding to the products of this saponification an amount of sulfuric acid corresponding to the amount of soda used for said saponification, separating the insoluble fatty acid products of this acid treatment from the acid solution and subjecting the whole of the acids present in these insoluble products to extraction by an alcohol.

7. The method which comprises saponifying a mass of cork by means of a dilute caustic soda solution in water, adding to the products of this saponification an amount of sulfuric acid corresponding to the amount of soda used for said saponification, separating the insoluble fatty acid products of this acid treatment from the acid solution, subjecting the whole of these insoluble products to extraction by methyl alcohol, distilling off this alcohol and subjecting the product thus obtained to extraction by a solvent of the group consisting of carbon tetrachloride and trichlorethylene.

8. The method according to claim 4 which further includes the step of boiling the mass of cork to be treated, prior to saponification thereof, in water at 100° C. for at least one hour and a half.

9. The method which comprises saponifying a mass of cork by means of caustic soda in solution in water, adding to the products of this saponification an amount of a mineral acid corresponding to the amount of soda used for said saponification, separating the insoluble fatty acid products of this acid treatment from the acid solution and subjecting the whole of the acids present in these insoluble products to extraction by carbon tetrachloride.

10. The method which comprises saponifying a mass of cork by means of caustic soda in solution in water, adding to the products of this saponification an amount of a mineral acid corresponding to the amount of soda used for said saponification, separating the insoluble fatty acid products of this acid treatment from the acid solution and subjecting the whole of the acids present in these insoluble products to extraction by trichlorethylene.

GEORGES DUPONT.
ANDRÉ GUILLEMONAT.

REFERENCES CITED

The following references are of record in the file of this patent:

Chemical Abstracts, vol. 11 (1917), pages 1157-8, citing Scurti et al.

Chemical Abstracts, vol. 25 (1931), pages 3320-21, citing Zetzsche et al.